US010294793B2

(12) United States Patent
Cariveau et al.

(10) Patent No.: US 10,294,793 B2
(45) Date of Patent: *May 21, 2019

(54) PDM PERFORMANCE SIMULATION AND TESTING

(71) Applicant: Basintek, LLC, Houston, TX (US)

(72) Inventors: Peter Thomas Cariveau, Houston, TX (US); Timothy Mark Miller, Klein, TX (US); Jing Lu, Houston, TX (US)

(73) Assignee: Abaco Drilling Technologies LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,143

(22) Filed: Mar. 28, 2018

(65) Prior Publication Data

US 2018/0216462 A1 Aug. 2, 2018

Related U.S. Application Data

(63) Continuation of application No. 15/464,640, filed on Mar. 21, 2017, now Pat. No. 9,938,829.

(60) Provisional application No. 62/311,278, filed on Mar. 21, 2016.

(51) Int. Cl.
| | | |
|---|---|---|
| *G01M 99/00* | (2011.01) | |
| *F01C 20/28* | (2006.01) | |
| *F01C 1/10* | (2006.01) | |
| *F04C 2/107* | (2006.01) | |
| *F03C 2/08* | (2006.01) | |

(52) U.S. Cl.
CPC .............. *F01C 20/28* (2013.01); *F01C 1/101* (2013.01); *F03C 2/08* (2013.01); *F04C 2/1071* (2013.01); *G01M 99/002* (2013.01); *G01M 99/007* (2013.01); *F04C 2270/80* (2013.01)

(58) Field of Classification Search
CPC .. F01C 20/28; F01C 1/101; F03C 2/08; F04C 2/1071; F04C 2270/80; G01M 99/007; G01M 99/002
USPC .......................................................... 73/788
See application file for complete search history.

(56) References Cited

U.S. PATENT DOCUMENTS

| | | | |
|---|---|---|---|
| 1,892,217 A | 12/1931 | Moineau | |
| 4,482,305 A | 11/1984 | Natkai et al. | |
| 4,540,347 A | 9/1985 | Child | |
| 4,976,595 A | 12/1990 | Taniguchi | |
| 5,368,108 A * | 11/1994 | Aldred | E21B 44/005 |
| | | | 175/40 |
| 5,779,452 A * | 7/1998 | McCombie | F01B 15/02 |
| | | | 137/625.25 |

(Continued)

*Primary Examiner* — Max H Noori
(74) *Attorney, Agent, or Firm* — Zeman-Mullen & Ford, LLP

(57) ABSTRACT

A method for measuring load performance of a positive displacement motor (PDM) test coupon. The test coupon comprises a partial length of a PDM stage and is received inside a sealable test chamber. In some embodiments, the test coupon may be cut from a failed PDM stage. The test chamber is filled with test fluid. In some embodiments, the test fluid may be drilling fluid sampled from a live well. Rotation of the rotor on the test coupon actuates rotation of the stator. A braking torque is applied to the stator rotation, enabling evaluation of, for example, fatigue load performance of test coupon. Additional embodiments comprise the rotor axis and the stator axis being offset in order to simulate rotor/stator eccentricity in a full size PDM stage.

28 Claims, 10 Drawing Sheets

(56) References Cited

U.S. PATENT DOCUMENTS

| | | | |
|---|---|---|---|
| 6,157,893 | A | 12/2000 | Berger et al. |
| 6,581,455 | B1 | 6/2003 | Berger et al. |
| 7,389,830 | B2 | 6/2008 | Turner et al. |
| 7,514,887 | B2 | 4/2009 | Mullin et al. |
| 8,388,327 | B2 | 3/2013 | Ree |
| 2001/0024618 | A1 | 9/2001 | Winmill |
| 2009/0220352 | A1 | 9/2009 | Carstensen |
| 2011/0011053 | A1* | 1/2011 | Benham ............... F04B 43/023 60/39.63 |
| 2014/0097026 | A1 | 4/2014 | Clark et al. |
| 2015/0022051 | A1 | 1/2015 | Meng et al. |
| 2015/0167466 | A1 | 6/2015 | Teodorescu et al. |
| 2017/0299452 | A1* | 10/2017 | Yasuda .................... G01L 5/28 |

* cited by examiner

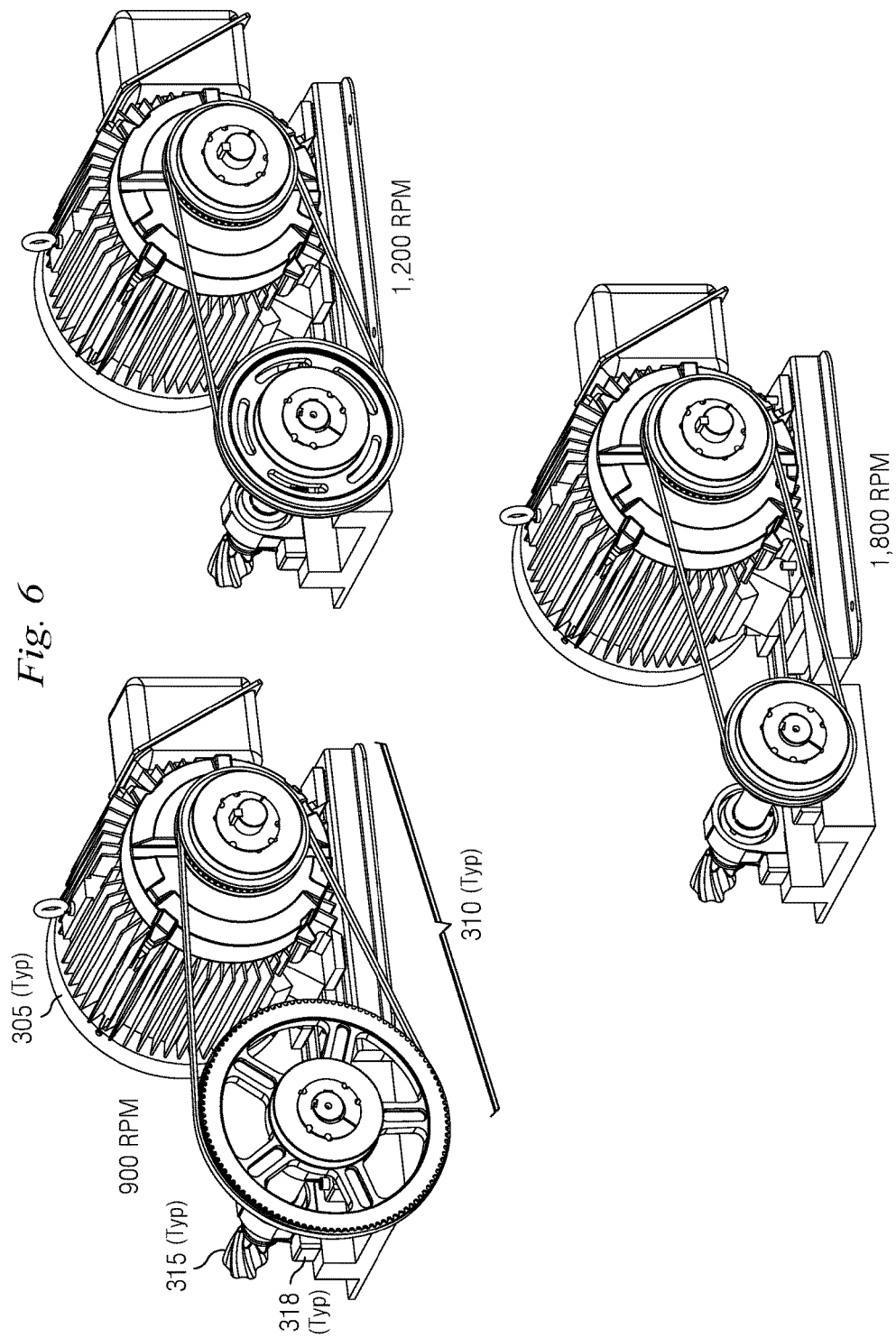

PDM PERFORMANCE SIMULATION AND TESTING

RELATED APPLICATIONS

This application is a continuation of, commonly-invented and commonly-assigned U.S. patent application Ser. No. 15/464,640 filed Mar. 21, 2017 (now U.S. Pat. No. 9,938, 929), which in turn claims the benefit of, and priority to, commonly-invented and commonly-assigned U.S. Provisional Patent Application Ser. No. 62/311,278 filed Mar. 21, 2016. The entire disclosure of 62/311,278 is incorporated herein by reference.

FIELD OF THE DISCLOSURE

This disclosure is directed generally to devices that test the performance of a subterranean positive displacement motor ("PDM"), and more particularly to a device that miniaturizes the performance testing of full-scale PDMs while still maintaining accurate simulation of downhole conditions during such miniaturized performance testing.

BACKGROUND OF THE DISCLOSED TECHNOLOGY

Currently, PDMs are tested using standardized ASTM protocols in order to simulate performance of parameters such as elastomer material performance and elastomer bonding performance under projected drilling loads. Conventional testing may be performed on failed PDM parts (typically stators) that have been retrieved from downhole service as part of an investigation into the cause of the failure. Alternatively, conventional testing may be performed as part of well planning activity, prior to drilling, in order to optimize selection of PDM components such as stator elastomer in view of the expected downhole environmental conditions and anticipated loading.

Conventional testing is done according to current applicable ASTM protocols. The ASTM tests are not particularly representative of specific expected or encountered downhole environments. First, the ASTM tests are not able to replicate the cyclic loading stresses encountered by PDMs in service. Second, the ASTM tests only peripherally simulate the elevated temperatures and pressures encountered by PDMs in service.

Generally, the ASTM tests are basic immersion tests in which an elastomer sample from a stator is first exposed to drilling fluid for a prescribed period at elevated temperatures, followed by performance evaluation by pull or tear testing. The performance evaluation is normally done at ambient temperatures and pressures. The purpose of the ASTM testing is to evaluate loss of physical properties in the rubber material and/or bond integrity. The ASTM testing may be done with a small volume of drilling fluid used in the specific drilling application. The drilling fluid sample may be taken from the actual drilling site.

Examples of specific conventional ASTM protocols include the following:
 ASTM D2240—Durometer Hardness (Shore A)
 ASTM D412—Tensile properties (Die C)
 ASTM D5289—Vulcanization using Rotorless Cure Meter (MDR tests)
 ASTM D624—Tear Strength (Die C)
 ASTM D3182—Practice for preparing standard vulcanized sheets (for tensile and tear bars)
 ASTM D429—Adhesion
 ASTM D6370—Compositional Analysis by Thermogravimetry (TGA)
 ASTM D471—Rubber Property—Effect of Liquids (Swell or immersion test)

In addition to the traditional ASTM testing, two other conventional test methods are known to evaluate the performance of PDM power sections. In contrast to the traditional ASTM protocols described above, however, these two test methods require large volumes of test drilling fluid to perform each test.

Flow loop testing attempts to simulate downhole PDM service by placing a full downhole motor in an enclosed dynamometer ("dyno"). Drilling fluid is introduced at full operating pressure to drive the PDM power section. It often takes hundreds or even thousands of gallons of drilling fluid to fill and operate the flow loop. Each well drilled may have different drilling fluid types, making a full scale dyno test cost prohibitive to perform on a frequent basis. Further, the specialized equipment required to handle drilling fluids under pressure and high temperature make this approach logistically challenging and often not economically viable.

Recirculating pump vessels have also been used in the past to evaluate the performance of PDMs. While pump vessels do not require the volume of drilling fluid needed by flow loops, pump vessels still require a minimum of 25 gallons of drilling fluid to operate. Further, pump vessels have limited load ranges that correspondingly limit the range of downhole environments that can be simulated.

The volumes of drilling fluid needed by flow loop testing and recirculating pump vessel testing present a further drawback that is inherent to these conventional tests. Often the need for testing and evaluation arises after there has been a specific downhole PDM failure. Investigation of the failure advantageously includes evaluation and testing of the power section in an environment that closely simulates the downhole conditions in which the failure occurred. Such simulation is enhanced greatly when the evaluation and testing can be done using a sample of the actual drilling fluid flowing through the power section at the time the failure occurred. Such samples can be taken, and are available, but they come in small volumes, typically 0.5 to 2 gallons—not nearly enough to do flow loop or recirculating pump vessel testing.

There is therefore a need in the art for a test apparatus that can closely simulate, evaluate and measure PDM performance under (1) the elevated temperatures encountered downhole, and (2) the cyclic loads encountered downhole. The test apparatus should nonetheless provide embodiments in which only small quantities of drilling fluid are required, ideally less than about 10 gallons of drilling fluid, preferably less than about 5 gallons and most preferably, less than about 2 gallons. Embodiments of the test apparatus should also ideally have a small enough footprint to be suitable to be housed in a conventional laboratory or at a wellsite location.

SUMMARY AND TECHNICAL ADVANTAGES

These and other drawbacks in the prior art are addressed by a test apparatus using a PDM test coupon that is a partial length of one stage of power section, mounted within a test chamber. In some embodiments, the longitudinal length of the test coupon is up to about 12 inches. The test chamber also holds a small volume of test fluid, sufficient to immerse the test coupon and occupy all of its internal progressing gaps. In some embodiments, the test fluid is drilling fluid maintained at predetermined and monitored elevated temperatures so as to simulate temperature performance in desired downhole conditions. The volume of test fluid/ drilling fluid required to fill the test apparatus is further advantageously small enough to allow, if desired, use of actual drilling fluid samples drawn from full operational power sections that may have failed downhole. It will be appreciated that the test coupon cannot be sealed because it is only a partial length of one stage of a PDM power section, and thus presents less than one complete progressing cavity. Therefore, the test apparatus does not pump drilling fluid through the test coupon per the conventional operation of a PDM. Instead, an external motor rotates the rotor section in the test coupon, actuating corresponding rotation of the stator section by contact between rotor section and the stator section. The rotation of the rotor section, with corresponding actuated rotation of the stator section, is all in the presence of test fluid in the progressing gap(s) between rotor section and stator section in the test coupon. In this way, traditional PDM interaction between rotor and stator via drilling fluid flow can be simulated without pumping drilling fluid. The test fluid in the test coupon is present to interact with the test coupon materials to simulate degradation that might be seen in actual downhole conditions. Note that the relative differential rotation of the rotor section and the stator section in the test coupon may cause the test fluid to flow under low pressure through progressing gaps between rotor and stator sections. In some embodiments, a flow loop of test fluid may form through two or more progressing gaps. In other embodiments where openings are provided in the stator section, a flow loop of test fluid may form through the progressing gaps, out of the stator section openings, into the annular space between the test coupon and the test chamber, and back into the progressing gaps again.

Once the rotor section and stator section are rotating, an external brake mechanism intentionally applies a braking torque to the rotation of the stator section against the externally-driven rotation of the rotor, causing the test coupon to come under controlled load. The braking force may be controlled, for example, by measuring the output torque of the stator section and adjusting the braking force to obtain a desired torque. This ensures the interface stress between the rotor and stator sections remains constant, resulting in a highly controlled fatigue loading being placed on the test coupon. Controlling the applied torque in this way enables multiple modes of evaluating performance of the test coupon. The performance of the test coupon in the test fluid environment can be monitored continuously over a wide range of loads placed cyclically on the coupon over time. In this way, a stress field can be generated between the rotor and stator sections in the test coupon that simulates very closely the same loading placed on a corresponding full scale power section in downhole service. Variables such as materials selection, performance optimization and useful downhole life, for example, can all be evaluated against the fatigue caused by the loading placed on the test coupon. Performance of the test coupon may be evaluated via measuring metrics including, but not limited to: (1) recording cycles to test coupon failure, via, for example, counting rotor section and/or stator section cycles through to failure, (2) examining the rotor section and/or the stator section for wear, (3) monitoring temperature change over time in the test chamber, and (4) monitoring temperature change over time in an elastomer layer provided by the stator section at its contact surface with the rotor section.

In other embodiments, an external motor may drive the stator section in the test coupon, and an external brake mechanism may intentionally slow the rotor section in order to place load on the test coupon.

In other embodiments, the separate external motors may drive the rotor section and the stator section in the test coupon. Controlled differential rotation of separate motors driving the rotor and stator may be used to place the test coupon under desired loads.

In other embodiments, the disclosed test apparatus provides a method of evaluating PDM power section materials at elevated drilling temperatures and under similar stress profiles as seen in downhole service by full scale PDM power sections. According to currently preferred embodiments, the test apparatus design uses a small section of the full scale PDM power section as a test coupon and preferably less than about two gallons of drilling fluid within the test chamber. Many of the advantages of conventional flow loop or recirculating pump vessel testing can thus be obtained using the disclosed test apparatus, while at the same time obviating the need for large footprint or high volumes of drilling fluid.

According to a first aspect, therefore, this disclosure describes an embodiment of a method for measuring load performance of a positive displacement motor (PDM) test coupon, the method comprising the steps of: (a) providing a PDM test coupon, the test coupon comprising a partial length of a PDM stage, the test coupon including a rotor section received inside a stator section, wherein the rotor section and the stator section are independently rotatable, wherein further at least one progressing gap on a helical pathway is formed between the rotor section and the stator section when the rotor section and the stator section are differentially rotated; (b) receiving the test coupon inside a sealable test chamber; (c) filling the test chamber with test fluid; (d) sealing the test chamber; (e) rotating the rotor section, thereby actuating corresponding rotation of the stator section in the presence of test fluid in the progressing gap; (f) applying a braking torque to said stator section rotation actuated in step (e); and (g) responsive to step (f), evaluating performance of the test coupon, wherein said evaluating step includes at least one substep selected from the group consisting of: (g1) controlling torque across the rotor section and the stator section; (g2) counting, through to failure of the test coupon, at least one of (1) rotor section rotation cycles and (2) stator section rotation cycles; (g3) examining at least one of (1) the rotor section and (2) the stator section for wear; and (g4) monitoring temperature change over time in the test chamber.

According to a second aspect, this disclosure describes an embodiment of a method for measuring load performance of a positive displacement motor (PDM) test coupon, the method comprising the steps of: (a) providing a PDM test coupon, the test coupon comprising a partial length of a PDM stage, the test coupon including a rotor section received inside a stator section, wherein the rotor section and the stator section are independently rotatable about a longitudinal rotor axis and a longitudinal stator axis respectively, wherein further the rotor axis and the stator axis are substantially parallel and offset by a preselected axis offset distance, wherein further at least one progressing gap on a helical pathway is formed between the rotor section and the stator section when the rotor section and the stator section are differentially rotated; (b) receiving the test coupon inside a sealable test chamber; (c) filling the test chamber with test fluid; (d) sealing the test chamber; (e) rotating the rotor section, thereby actuating corresponding rotation of the stator section in the presence of test fluid in the progressing gap; (f) applying a braking torque to said stator section rotation actuated in step (e); and (g) responsive to step (f), evaluating performance of the test coupon, wherein said evaluating step includes at least one substep selected from the group consisting of: (g1) controlling torque across the rotor section and the stator section; (g2) counting, through to failure of the test coupon, at least one of (1) rotor section rotation cycles and (2) stator section rotation cycles; (g3) examining at least one of (1) the rotor section and (2) the stator section for wear; and (g4) monitoring temperature change over time in the test chamber. According further to the second aspect, embodiments of the test coupon, may be selected to be representative of a full size PDM stage having a known rotor/stator eccentricity, in which case the preselected axis offset distance is selected to be substantially the same as the known rotor/stator eccentricity.

Embodiments according to the first or second aspects may also include the stator section providing an elastomer interface at a contact surface with the rotor section inside the test coupon, and in which the evaluating step (g) includes at least one substep selected from the group consisting of: (g1) controlling torque across the rotor section and the stator section; (g2) counting, through to failure of the test coupon, at least one of (1) rotor section rotation cycles and (2) stator section rotation cycles; (g3) examining at least one of (1) the rotor section and (2) the stator section for wear; (g4) monitoring temperature change over time in the test chamber; and (g5) monitoring temperature change over time in the elastomer interface.

In other embodiments according to the first or second aspects, the at least one progressing gap comprises a plurality of progressing gaps, and in which a first flow loop of test fluid is formed through the plurality of progressing gaps when the test chamber is sealed and the rotor section is rotated.

In other embodiments according to the first or second aspects, an annular cavity is formed between an external periphery of the stator section and an internal periphery of the test chamber, wherein the at least one progressing gap, a plurality of openings in the stator section, and the annular cavity form a second flow loop of test fluid when the test chamber is sealed and the rotor section is rotated.

According to third and other aspects and embodiments, step (c) of the method according to the first or second aspects requires no more than about 25 gallons of test fluid, and most preferably, no more than about 2 gallons of test fluid. Embodiments of the test coupon may have an overall longitudinal length of no more than about 12 inches. Embodiments of the method according the first or second aspects may further comprise further steps of maintaining a preselected temperature and/or pressure inside the test chamber during at least steps (e) and (f). Embodiments of the test coupon may further be cut from a full size PDM stage through which drilling fluid was previously caused to flow. Step (f) of the method according to the first or second aspects may be accomplished using a continuous-slip brake It is therefore a technical advantage of the disclosed test apparatus to miniaturize the performance testing of PDM power sections in downhole conditions by accurately simulating such conditions (for example, temperature and stress loading) in a partial section of one stage of a PDM power section. The footprint of the disclosed test apparatus is suitable to house the apparatus in a conventional laboratory or even at the wellsite.

A further technical advantage of the disclosed test apparatus is to provide a PDM test apparatus that enables performance testing using a small volume of drilling fluid. In this way, if desired, the disclosed test apparatus can accurately simulate downhole service conditions using samples of actual drilling fluid extracted from a PDM previously in downhole service (such samples known to be available only in small quantities).

A further technical advantage of the disclosed test apparatus is to avoid eccentric rotation vibration in the PDM power section test coupon during testing. By avoiding such vibration, the disclosed test apparatus enables performance evaluation of a PDM power section test coupon that is isolated from the effects of vibration caused by the eccentric rotation of the rotor within the stator. Conventionally, the construction of PDM power sections provides a hard (e.g. metal) rotor surface contacting a resilient stator (usually providing an elastomer or rubber through part or all of its cross-section). In normal PDM power section operations, the eccentric rotation of the rotor within the stator imparts cyclic loads (including, without limitation, compressive, shear and tensile loads) on the resilient stator material, particularly on the stator lobes. These loads imparted by cyclic contact are all included in the suite of performance metrics sought to be simulated and evaluated by the disclosed test apparatus.

However, the eccentric rotation of the rotor during normal PDM power section operations also creates many modes of vibration throughout the PDM assembly and elsewhere on the drill string. The rotor on a full-size downhole PDM distributes torque and tilting reaction forces along the full length of the elastomer component of the stator. The large length to diameter ratio of the power section allows these forces to be distributed along the length of multiple power section stages. The PDM, over its entire multi-stage length, can therefore absorb the vigorous dynamic forces created as the rotor orbits eccentrically in the stator. In contrast, the disclosed test apparatus evaluates performance on only a partial section of one PDM power section stage. It is therefore not possible in the disclosed test apparatus to stabilize the rotor section within the test coupon against the vibrational effect of eccentric rotation and tilting forces as might be seen in "live" downhole operations, since the length of the rotor section in the test coupon is too short to have sufficient longitudinal flexure to compensate for eccentric rotation vibration.

Embodiments of the disclosed test apparatus therefore substantially eliminate eccentric rotation vibration from the test coupon by setting and holding the rotor rotation axis on a predetermined, fixed offset from the stator rotation axis. The offset is selected to be approximately equal to the design eccentricity of the full-size, operational power section whose performance the test coupon seeks to replicate and evaluate. The disclosed test apparatus thus generates test results that reflect performance isolated from substantially all eccentric rotation vibration, in a test coupon that can be very short in length and requiring only a small volume of drilling fluid. In this way, the results generated by the disclosed test apparatus will more accurately predict corresponding or vibration-compensated or vibration-isolated performance expected in full-size PDM power sections operating downhole.

The disclosed test apparatus provides yet a further advantage in embodiments in which eccentric rotation vibration is substantially eliminated. In embodiments where an offset is provided between axes of rotor rotation and stator rotation (in order to elimination eccentric rotation vibration), the external drive train rotating the rotor is greatly reduced in complexity which still giving a very accurate stress field within the test coupon. In embodiments where an offset is not provided between axes of rotor rotation and stator rotation, a transmission is required in the external drive train to counteract or eliminate eccentric rotation vibration. The rotor must also be longer in such embodiments in order to generate flexure. Such an additional transmission and rotor length adds cost, complexity, and inevitably (1) increases potential footprint and (2) requires a higher volume of drilling fluid.

The foregoing has rather broadly outlined some features and technical advantages of the disclosed test apparatus, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of embodiments described in detail below, and the advantages thereof, reference is now made to the following drawings, in which:

FIG. 6 illustrates exemplary embodiments of drive train 310 as more generally illustrated on FIG. 3.

DETAILED DESCRIPTION

Figure 1A:
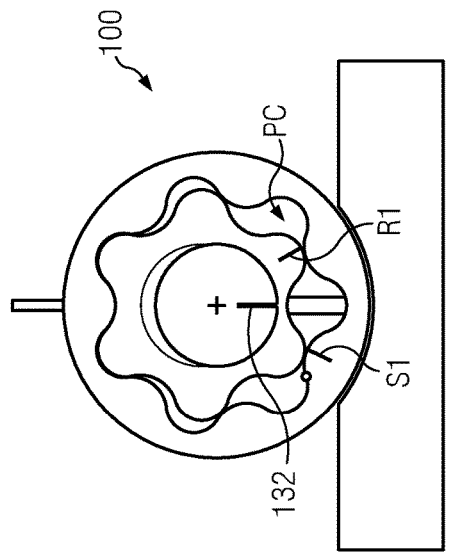
FIGS. 1-A through 1-J depict the operation of a conventional power section 100 in a series of freeze-frame cutaway section views of the conventional power section in operation.
Figure 1C:
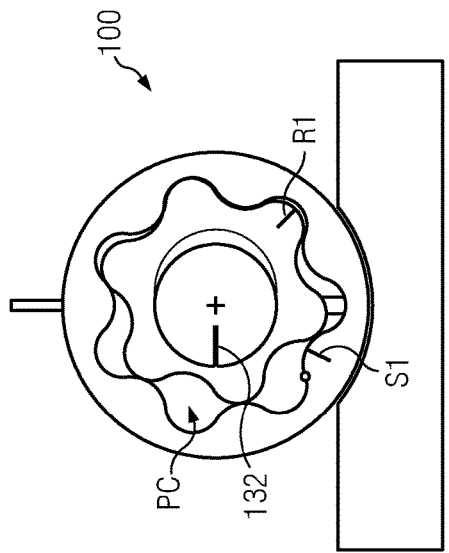
Figure 1B:
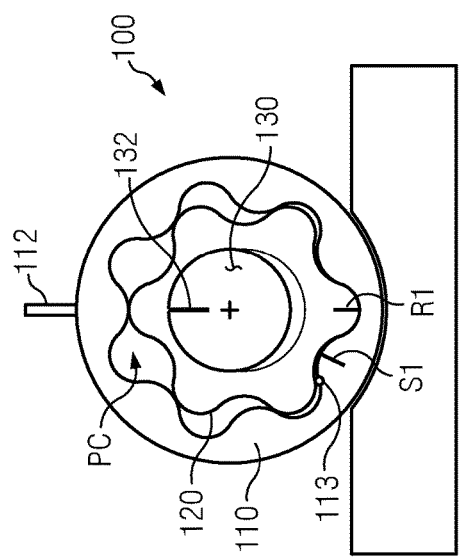
Figure 1D:
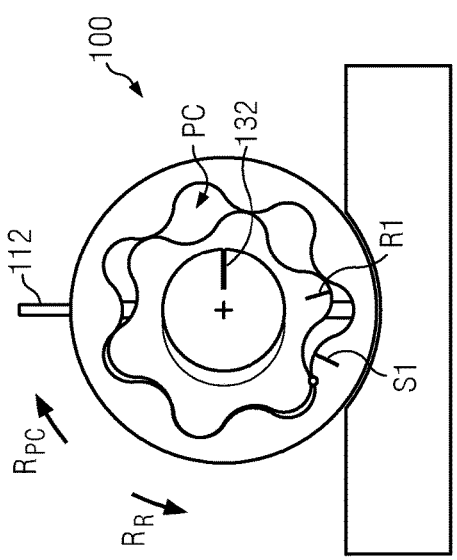
Figure 1E:
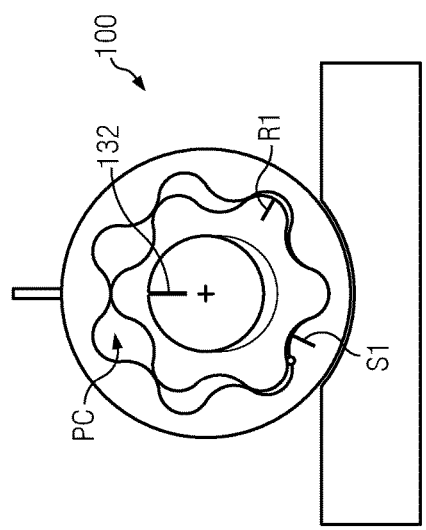
Figure 1F:
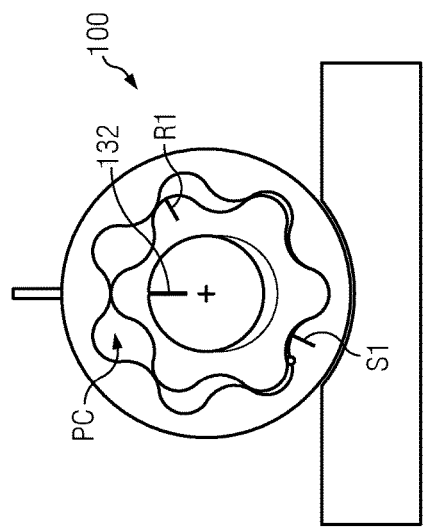
Figure 1G:
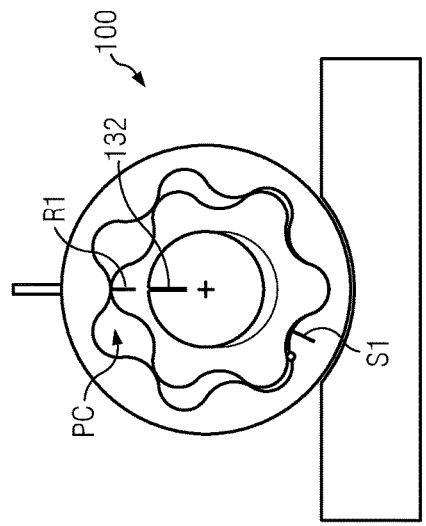
Figure 1H:
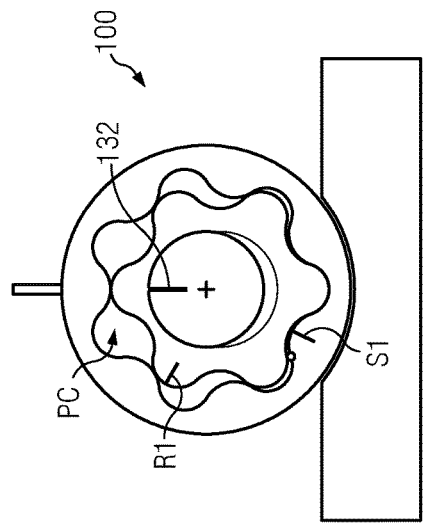
Figure 2A:
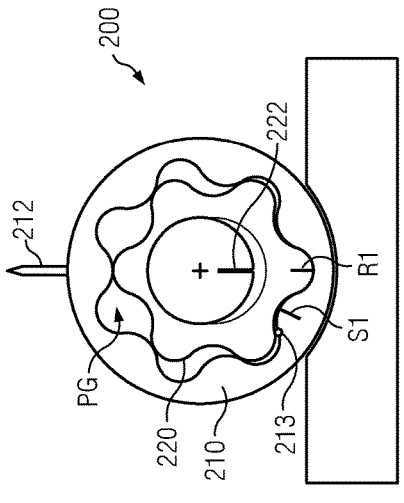
FIGS. 2-A through 2-J depict movement of corresponding components to FIGS. 1-A through 1-J in the disclosed new test apparatus 200, wherein such movement is also depicted in a series of freeze-frame cutaway section views.
Figure 2B:
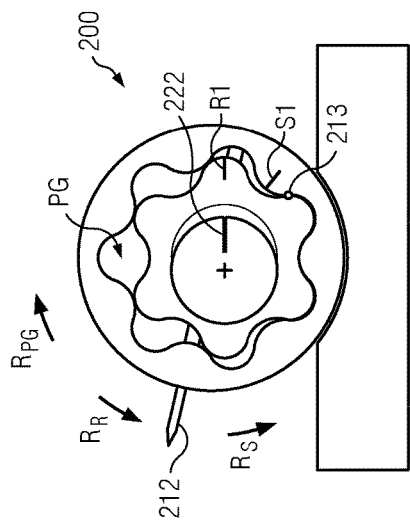
Figure 1I:
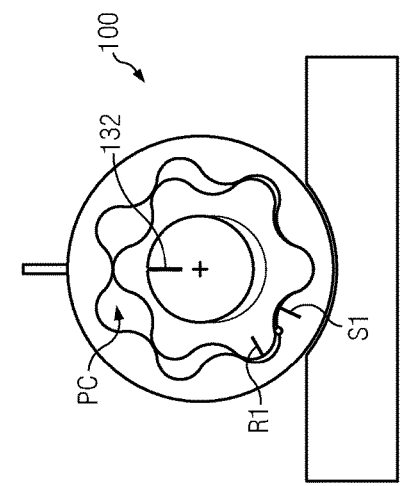
Figure 1J:
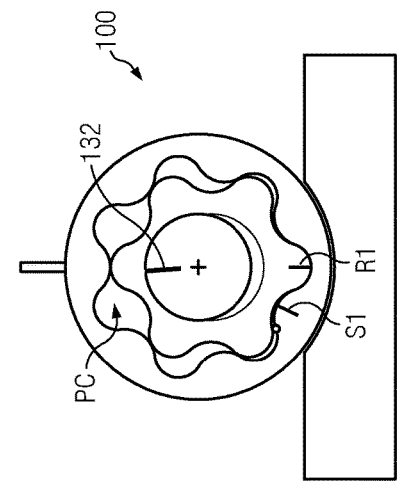
Figure 2C:
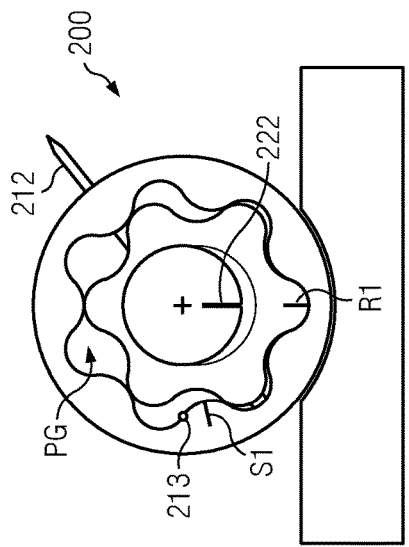
Figure 2E:
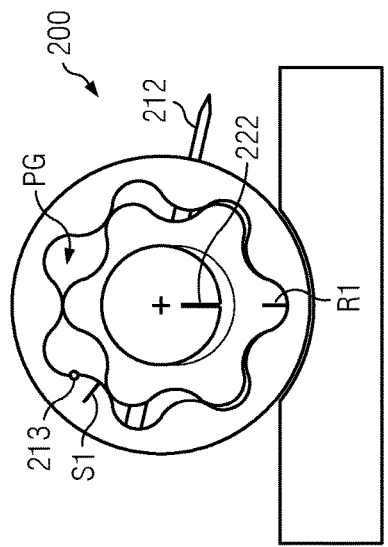
Figure 2D:
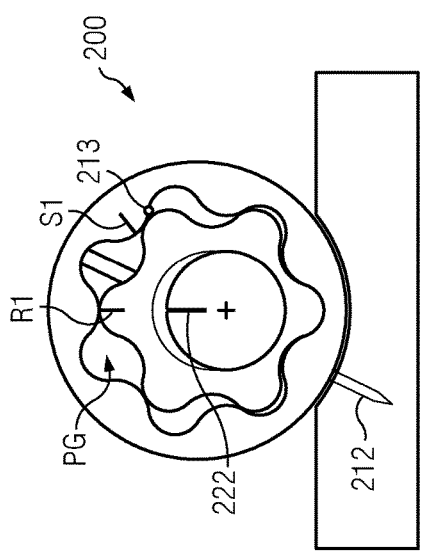
Figure 2F:
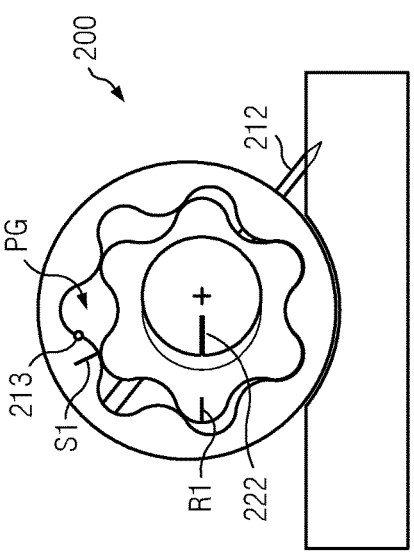
Figure 2G:
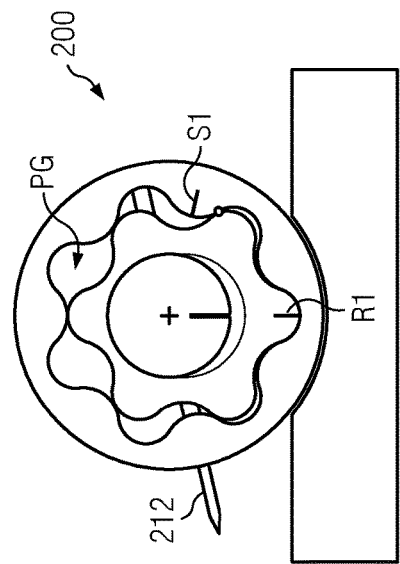
Figure 2H:
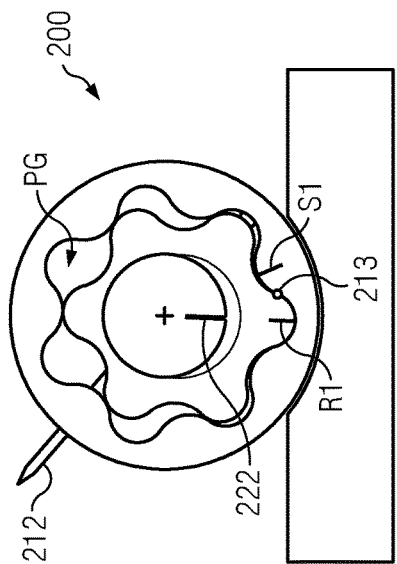
Figure 2I:
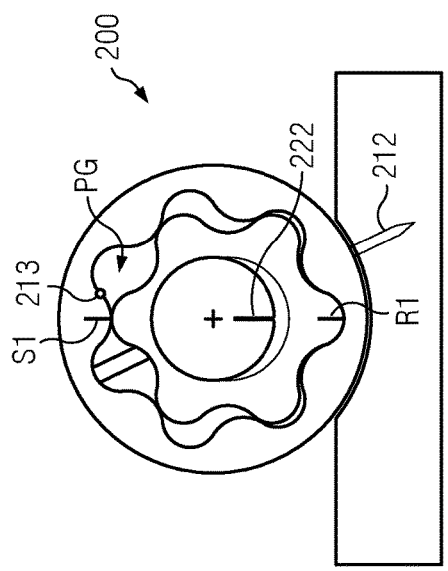
Figure 2J:
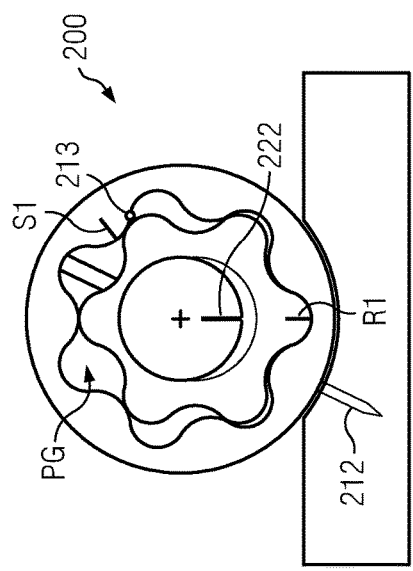

As discussed summarily above in this disclosure, this application is directed to a PDM testing apparatus using a rotor/stator test coupon that is a partial length of one stage of a power section. A stage of a power section is defined by the minimum length to seal a single helical progressing cavity. The relationship describing the helical length of a single progressing cavity is based on the rotor to stator lobe count ratio and can be expressed as:

Stator Pitch Length=$(N+1)/N$×Rotor Pitch Length

Stator pitch length is a PDM design parameter chosen to give the desired volumetric fluid flow ratio for the selected rotor/stator configuration.

FIGS. 1-A through 1-J depict the mechanics of a conventional progressing cavity power section, as is well known in the prior art. Such progressing cavity power sections are also well known as "Moineau" devices. FIGS. 1-A through 1-J depict the operation of such a conventional power section 100 in a series of freeze-frame cutaway section views of the power section in operation. The series of freeze-frame views depicted in FIGS. 1-A through 1-J are in sequence. Parts and other features of conventional power section 100 are identified by reference number or letter, as described in detail further below. Where the same reference number or letter is used in FIGS. 1-B through 1-J, the same part or feature of power section 100 is being identified on that Figure as depicted on FIG. 1-A. In this way, reference numbers and letters on FIGS. 1-B through 1-J can be omitted for clarity on some views while still allowing the reader to understand the subject matter depicted on FIGS. 1-B through 1-J.

As noted, power section 100 as depicted in FIGS. 1-A through 1-J is conventional. Such power sections are designed using intermeshing continuous helical pathways that provide, in cross section, cooperating lobed gear profiles that intermesh with one another in an "n" and "n+1" combination. Typically the inner rotor has n lobes and the outer stator gear has n+1 lobes. Referring to FIG. 1A, rotor 120 is depicted with 6 lobes, and stator 110 has 7 lobes, although these values are purely by way of example. As will be seen generally from FIGS. 1A through 1-J viewed in sequence, the precise cross-sectional profiles of these these-gear-within-a-gear devices are normally described by hypocycloid geometry created by rolling circle techniques. The resulting gear devices are helically swept over the axial lengths of the rotor and stator. The intermeshing along the axial length creates progressing cavities on a helical pathway between the rotor and stator, identified in cross-section on FIG. 1A as PC, through which a flow of fluid drives rotor 120 around the inner periphery of stator 110.

The hypocycloid geometry of the intermeshed lobes on rotor 120 and stator 110 thus compels that in conventional PDM power sections such as power section 100 on FIG. 1-A, rotor 120 orbits within stator 110 at a known eccentricity from a central longitudinal axis. This eccentricity is a derived relationship and is related to the curvature and lobe heights generated from the mathematical expressions defining hypocycloid and true rolling motion used in the rotor and stator geometries. Review of FIGS. 1-A through 1-J in sequence illustrate this conventional eccentricity in more detail.

Referring first to FIG. 1-A, stator 110 includes rotational marker 112 and point marker 113. Rotational marker 112 sets a fixed point on the outer periphery of stator 110, and point marker 113 sets a fixed point on the inner periphery of stator 110 (adjacent reference point "S1" on stator 110). It will be seen that the location of markers 112 and 113 on subsequent views in FIGS. 1-B through 1-J does not change, indicating that stator 110 is stationary throughout the operation of conventional power section 100 depicted by FIGS. 1-A through 1-J.

With further reference to FIG. 1-A, rotor 120 includes fixed reference point "R1" on the outer periphery of one of its lobes. FIG. 1-A also shows progressing cavity (PC) position marker 130, on which PC marker line 132 indicates the position of the approximate most open point of progressing cavity PC. PC position marker 130 rotates in synch with progressing cavity PC around a central longitudinal axis through stator 110. PC position marker 130 thus also serves to illustrate and highlight the eccentric rotation of rotor 120 within stator 110. It will be seen on FIG. 1-A that that PC position marker 130 is offset from a central longitudinal axis through rotor 120.

Referring now to FIG. 1-B, a flow of drilling fluid (not illustrated) has displaced rotor 120 within stator 110 such that progressing cavity PC has rotated approximately 90 degrees clockwise within stator 110 from the corresponding progressing cavity position depicted on FIG. 1-A. This rotation of progressing cavity PC is illustrated by the new position of PC marker line 132 on FIG. 1-B, as well as a new general position on FIG. 1-B of progressing cavity PC. FIG. 1-B also shows that in response to clockwise movement of PC, rotor 120 has rotated counterclockwise as shown by the new position of rotor reference point R1. FIG. 1-B illustrates the clockwise movement of progressing cavity PC by arrow $R_{PC}$, and the responsive counterclockwise movement of rotor 120 by arrow $R_R$.

FIG. 1-C illustrates that the flow of drilling fluid has displaced rotor 120 within stator 110 such that progressing cavity PC has rotated approximately a further 90 degrees clockwise within stator 110 from the corresponding progressing cavity position depicted on FIG. 1-B. The relative movement of components within stator 110 can be seen from the new positions of progressing cavity PC, PC marker line 132, and rotor reference point R1 on FIG. 1-C, as compared to their corresponding positions on FIGS. 1-A and 1-B.

FIGS. 1-D and 1-E each show a further rotation of approximately 90 degrees clockwise of progressing cavity PC over the previously illustrated positions. Again, the relative movement of components within stator 110 can be seen from the new positions of progressing cavity PC, PC marker line 132, and rotor reference point R1 on each advancing view on FIGS. 1-A through 1-E. It will be appreciated that on FIG. 1-E, progressing cavity PC has made one complete revolution of stator 110 over the starting position on FIG. 1-A.

FIGS. 1-F through 1-J illustrate the counterclockwise rotation of rotor 120 within stator 110 responsive to subsequent full revolutions clockwise of progressing cavity PC. In each of FIGS. 1-A, and then 1-F through 1-J, progressing cavity PC has made one further full clockwise revolution over the previously illustrated view. When FIGS. 1-A, and then 1-F through 1-J are viewed in sequence, the new position of rotor reference point R1 can be seen in response to one additional revolution of progressing cavity PC. It will be appreciated that in FIG. 1-J, progressing cavity PC has made 6 clockwise revolutions of stator 110 over the view depicted in FIG. 1-A, during which time rotor reference point R1 has made one counterclockwise revolution, indicating that the eccentricity of rotor 120 within stator 110 is in the same state in FIG. 1-J as it was initially in FIG. 1-A.

As noted throughout the disclosure immediately above, FIGS. 1-A through 1-J illustrate movement of components within a conventional power section 100. FIGS. 2-A through 2-J depict movement of corresponding components within the disclosed new test apparatus 200. As with FIGS. 1-A through 1-J, FIGS. 2-A through 2-J depict such movement within test apparatus 200 in a series of freeze-frame cutaway section views of the test apparatus in operation. The series of freeze-frame views depicted in FIGS. 2-A through 2-J are in sequence. Similar to conventional power section 100 depicted in FIGS. 1-A through 1-J, test apparatus 200 in FIGS. 2-A through 2-J provides a rotor 220 with 6 lobes operating inside a stator 210 with 7 lobes. Where the same reference number or letter is used in FIGS. 2-A through 2-J, the same part or feature of test apparatus 200 is being identified. In this way, reference numbers and letters on FIGS. 2-A through 2-J can be omitted for clarity on some views while still allowing the reader to understand the subject matter depicted on FIGS. 2-A through 2-J.

The "Summary" section describes above how the disclosed test apparatus 200 tests less than one full length of a full downhole PDM power section stage, and thus necessarily cannot provide a series of full progressing cavities (one full stage of a power section being defined by the minimum length to seal a single helical progressing cavity, see above). Test apparatus 200 thus cannot be sealed to operate conventionally with moving drilling fluid driving a rotor in a stationary stator (as illustrated and described above with reference to FIGS. 1-A through 1-J). Test apparatus 200 thus does not provide progressing cavities as illustrated as PC on FIGS. 1-A through 1-J. In contrast, as illustrated on FIGS. 2-A though 2-J, test apparatus 200 provides progressing gaps PG on helical pathways formed between rotor 220 and stator 210 when rotor 220 and stator 210 are differentially rotated. Progressing gaps PG on FIGS. 2-A though 2-J are necessarily only a partial section of corresponding progressing cavities PC found on a full PDM power stage, as illustrated on FIGS. 1-A through 1-J.

In operation, currently preferred embodiments of test apparatus 200 on FIGS. 2-A through 2-J provide an external motor (not illustrated on FIGS. 2-A through 2-J) to rotate rotor 220 while submersed in test fluid/drilling fluid inside stator 210. As rotor 220 rotates, it actuates corresponding rotation of stator 210 via contact between rotor 220 and stator 210. An external brake mechanism (again not illustrated on FIGS. 2-A through 2-J) is then activated to apply braking torque to intentionally slow the rotation of stator 210 against the powered rotation of rotor 220. Applied braking torque can be finely controlled. In this way, a controlled stress field can be intentionally introduced on the components inside test apparatus 200 that approximate closely in kind, location, and strength the operational stresses experienced inside conventional power section 100 on FIGS. 1-A through 1-J when drilling fluid is pumped through progressing cavity PC to rotate rotor 120 within stationary stator 110.

Looking at FIGS. 2-A through 2-J in more detail, FIG. 2-A illustrates test apparatus 200 with the following parts and features, many of which are counterparts to the corresponding parts and features described above with respect to FIGS. 1-A through 1-J:

Stator 210
Stator rotational marker 212
Stator point marker 213
Stator reference point S1
Rotor 220
Rotor reference point R1
Progressing gap PG along the axial length of rotor 220 and stator 210, on a helical pathway formed between rotor 220 and stator 210 when rotor 220 and stator 210 are differentially rotated.

Additionally, FIG. 2-A illustrates rotor rotation marker line 222, which, along with rotor reference point R1, indicates rotation of rotor 220 relative to other components in test apparatus 200 as views advance through FIGS. 2-A through 2-J.

Referring now to FIG. 2-B, external rotor motor (not illustrated) has rotated rotor 220 approximately 90 degrees counterclockwise within stator 210 from the corresponding position of rotor 220 depicted on FIG. 2-A. As a result, rotational motion forces from rotor 220 have exerted themselves on stator 210, actuating rotation of stator 210 in a counterclockwise direction. This displacement of stator 210 can be seen by comparing the relative positions of stator rotational marker 212, stator point marker 213 and stator reference point S1 on FIG. 2-B as compared to FIG. 2-A. Additionally the displacement of rotor 220 by approximately 90 degrees counterclockwise in FIG. 2-B has caused progressing gap PG to move in a clockwise direction away from its corresponding position in FIG. 2-A. This clockwise movement of progressing gap PG is best seen by comparing its displaced position relative to stator rotational marker 212 in FIG. 2-A and then FIG. 2-B. FIG. 2-B illustrates the counterclockwise movement of rotor 220 by arrow $R_R$, the responsive counterclockwise movement of stator 210 by arrow R$_S$, and the resulting clockwise movement of progressing gap PG by arrow R$_{PG}$.

FIG. 2-C illustrates that external rotor motor (not illustrated) has rotated rotor 220 approximately 90 degrees further counterclockwise within stator 210 from the corresponding position of rotor 220 depicted on FIG. 2-B. As a result, rotational motion forces from rotor 220 have acted on stator 210, causing stator 210 to rotate further in a counterclockwise direction. This displacement of stator 210 can be seen by comparing the relative positions of stator rotational marker 212, stator point marker 213 and stator reference point S1 on FIG. 2-C as compared to FIG. 2-B. Additionally the displacement of rotor 220 by approximately 90 degrees further counterclockwise in FIG. 2-C has caused progressing gap PG to move in a clockwise direction away from its corresponding position in FIG. 2-B, as seen by comparing the position of progressing gap PG in FIG. 2-C relative to stator rotational marker 212 in FIG. 2-B.

FIGS. 2-D and 2-E each show a further rotation of approximately 90 degrees counterclockwise of rotor 220 over the previously illustrated positions. Again, the relative movement of components within stator 210 can be seen from the new positions of rotor rotation marker line 222, rotor reference point R1, stator rotational marker 212, stator point marker 213, stator reference point S1, and progressing gap PG on each advancing view on FIGS. 2-A through 2-E. It will be appreciated that on FIG. 2-E, external rotor motor (not illustrated) has caused rotor 220 to make one complete revolution of stator 210 over the starting position on FIG. 2-A.

FIGS. 2-F through 2-J illustrate the counterclockwise rotation of stator 210 responsive to subsequent full revolutions counterclockwise of rotor 220. In each of FIGS. 2-A, and then 2-F through 2-J, rotor 220 has made one further full counterclockwise revolution over the previously illustrated view. When FIGS. 2-A, and then 2-F through 2-J are viewed in sequence, the new relative position of stator rotational marker 212, stator point marker 213, stator reference point S1, and progressing gap PG can be seen in response to one additional revolution of rotor 220. It will be appreciated that in FIG. 2-J, rotor reference point R1 has made 6 counterclockwise revolutions as compared to the view depicted in FIG. 2-A, during which time stator reference point S1 has made almost one counterclockwise revolution in the orbital distance separating rotor reference point R1 and stator reference point R1 during rotation. It will be appreciated that with one further complete counterclockwise revolution of rotor reference point R1 (a seventh overall rotation), stator reference point S1 will have made one complete counterclockwise revolution in the orbital distance separating rotor reference point R1 and stator reference point S1, and will further have returned to the same position relative to rotor reference point R1 as depicted in FIG. 2-A.

Returning now to view FIGS. 1-A through 1-E in sequence, it will be appreciated rotor 120 is in an eccentric orbit within stator 110 during in the operation of conventional power section 100. Conventionally, the construction of PDM power sections provides a hard (e.g. metal) rotor surface contacting a resilient stator (usually providing an elastomer or rubber through part or all of its cross-section). As described above in the "Summary" section, in normal PDM power section operations, the eccentric rotation of the rotor within the stator imparts cyclic loads (including, without limitation, compressive, shear and tensile loads) on the resilient stator material, particularly on the stator lobes. The eccentric rotation of the rotor during normal PDM power section operations also creates many modes of vibration throughout the PDM assembly and elsewhere on the drill string. It will be appreciated that these vibrations, as experienced downhole, can be addressed over the length of a full power section stage by fixing the ends of the rotor and allowing the natural flexure of the rotor to compensate. However, in short lengths of conventional power section configured according to FIGS. 1-A through 1-E, such eccentric rotation vibrations cannot easily be compensated for, since the rotor is too short to have the required flexure.

Turning now to view FIGS. 2-A through 2-E in sequence, it will be appreciated that embodiments of the disclosed test apparatus 200 are reconfigured in a way to optimize, and in some cases to substantially eliminate, any eccentric rotation vibration that might potentially arise in the test coupon, so that performance evaluation of the components of the test coupon can be conducted free of the effects of such vibration. FIGS. 2-A through 2-E show that stator 210 and rotor 220 each rotate independently about their own fixed, substantially parallel longitudinal axes, and that the rotor rotation axis is set at a fixed offset distance from the stator rotation axis. The fixed offset distance is a predetermined design choice, selected according to the size and lobe count of the rotor and stator, and further according to the amount of operational contact desired by the rotor on the stator as the rotor is externally rotated. Comparison should now be made with the eccentric orbit of rotor 120 within stator 110 on FIGS. 1-A through 1-E in sequence, where rotor 120 makes operational contact on stator 110 as rotor 120 moves around the inner periphery of stator 110. Returning to FIGS. 2-A through 2-E, it will be appreciated that by selecting, setting and holding the rotor rotation axis of rotor 220 at a fixed offset distance from the rotation axis of stator 210, the same operational contact between rotor 220 and stator 210 can be replicated in test apparatus 200 as is experienced in conventional PDM power section 100 on FIGS. 1-A through 1-E. In test apparatus 200 on FIGS. 2-A through 2-E, however, there is no eccentric orbital rotation of rotor 220 within stator 210, thereby substantially eliminating vibration that might otherwise be caused by such eccentric orbital rotation.

Previous disclosure described how in most test environments, test apparatus 200 will be configured such that the offset between of rotor 220 and stator 210 is substantially the same as the eccentricity of the rotor's orbit in a full-size PDM whose performance the test coupon is designed to evaluate. For purposes of this paragraph, such offset between longitudinal rotational axes of rotor 210 and stator 220 will be referred to as the "ideal eccentricity". Additional embodiments of test apparatus 200 may be configured with variations in offset (greater or smaller) away from the ideal eccentricity. Such additional embodiments will simulate (and enable corresponding performance evaluation under) extreme loading conditions experienced by full-length PDM power sections in environments where the ambient dynamic loading conditions are deflecting rotor's eccentric orbit beyond design.

Physical embodiments of the disclosed test apparatus are now described with reference to FIGS. 3 through 6. As before, where the same reference number or letter is used in FIGS. 3 through 6, the same part or feature is being identified on more than one Figure.

Figure 3:
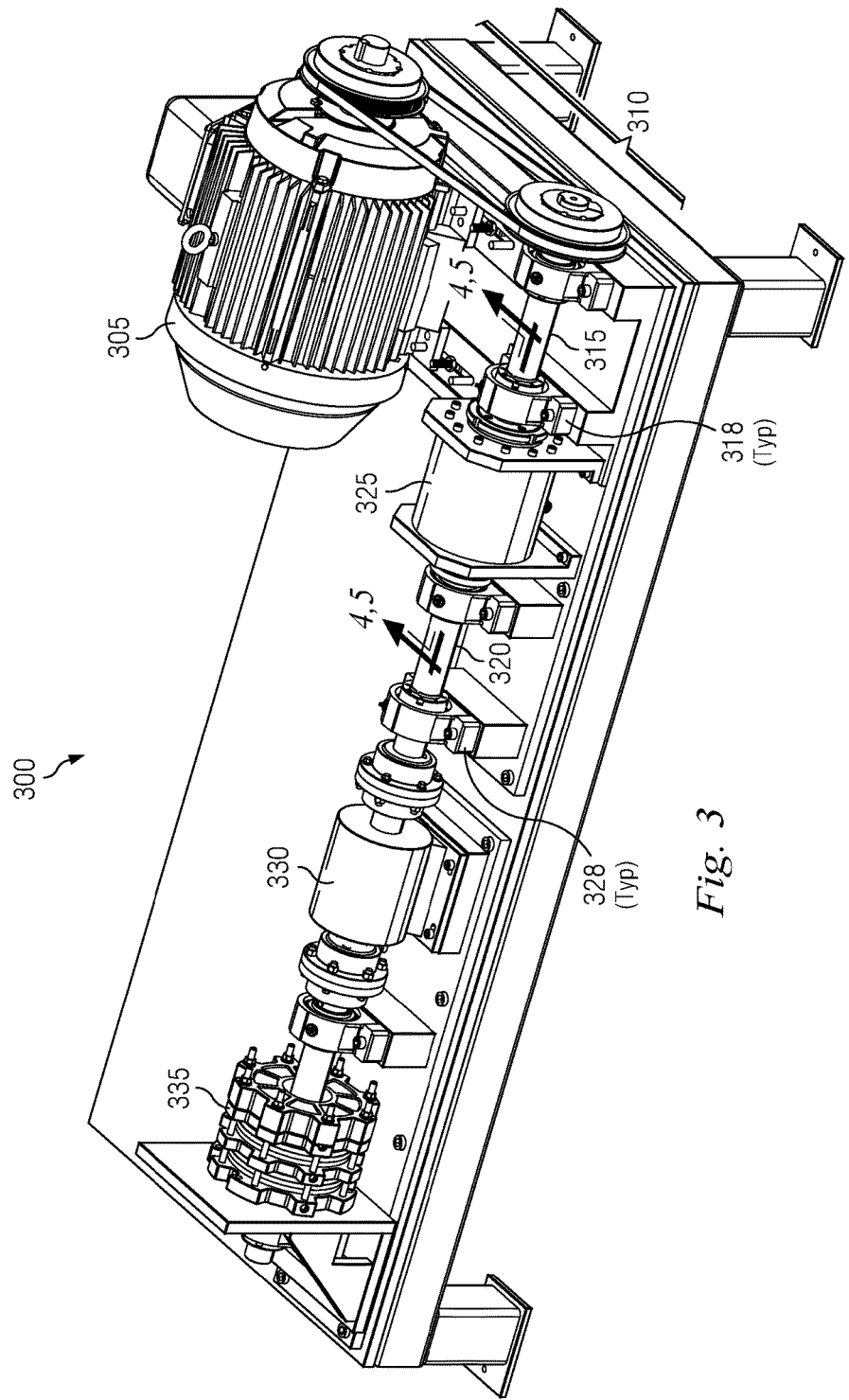
FIG. 3 shows an exemplary layout for test bed 300 on which components may be secured for enabling the disclosed new test apparatus 200.

FIG. 3 shows an exemplary layout for test bed 300 on which components may be secured for enabling the disclosed test apparatus. External motor 305 provides rotational power to rotor section 315 via drive train 310. External motor 305 is illustrated on FIG. 3 as an electric motor. The scope of the disclosed test apparatus is indifferent, however, to the type of external motor selected. Drive train 310 is illustrated in FIG. 3 as a belt-and-pulley drive train. Embodiments of test bed 300 that provide drive train 310 as a belt-and-pulley train will gain further advantages as described below with reference to FIG. 6. However, this disclosure is not limited to embodiments whose drive train 300 is a belt-and pulley train.

Rotor section 315 on FIG. 3 is set rotationally in place on rotor bearings 318. It will be understood from momentary reference to FIG. 5 that a distal end of rotor section 315 terminates inside test chamber 325, and functions as the rotor portion of the test coupon under analysis in test chamber 325. Test chamber 325 is shown sealed on FIG. 3. Embodiments of the internals of test chamber 325 are discussed further below with reference to FIGS. 4, 5 and 5A. Returning to FIG. 3, stator shaft 320 exits test chamber 325 and will be understood to be rotationally connected to stator section 321 inside test chamber 325 (again, refer momentarily to FIG. 4). Stator bearings 328 set stator shaft 320 rotationally in place. Stator shaft 320 is rotationally connected to torque sensor 330, which measures the torque generated by stator shaft 320 as stator shaft 320 rotates in response to external motor 305 driving rotor 315. Torque sensor 330 is further subject to intentional slowing of rotation via a braking torque supplied by continuous-slip brake 335, whereby fine control of the braking torque induces a controlled stress field (not illustrated) between rotor 315 and stator 321 inside test chamber test chamber 325. While the embodiments described with reference to FIG. 3 refer to a continuous-slip brake 335, it will be understood that the scope of the test apparatus is not limited in this regard, and that other types of conventional brakes may be substituted for continuous-slip brake 335.

Figure 4:
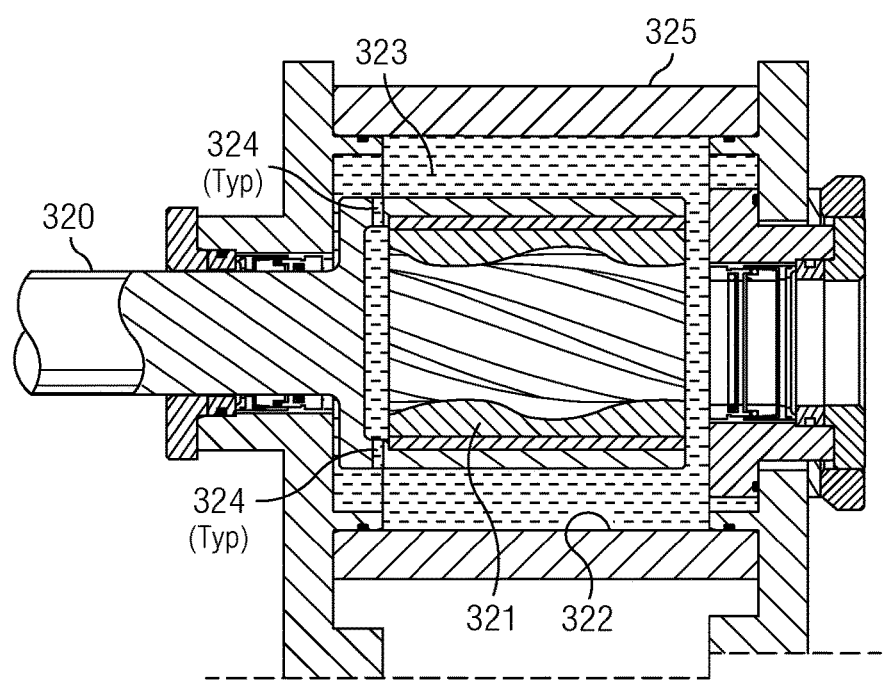
FIG. 4 illustrates test chamber 325 in cutaway view with internals and surrounding components.
Figure 5:
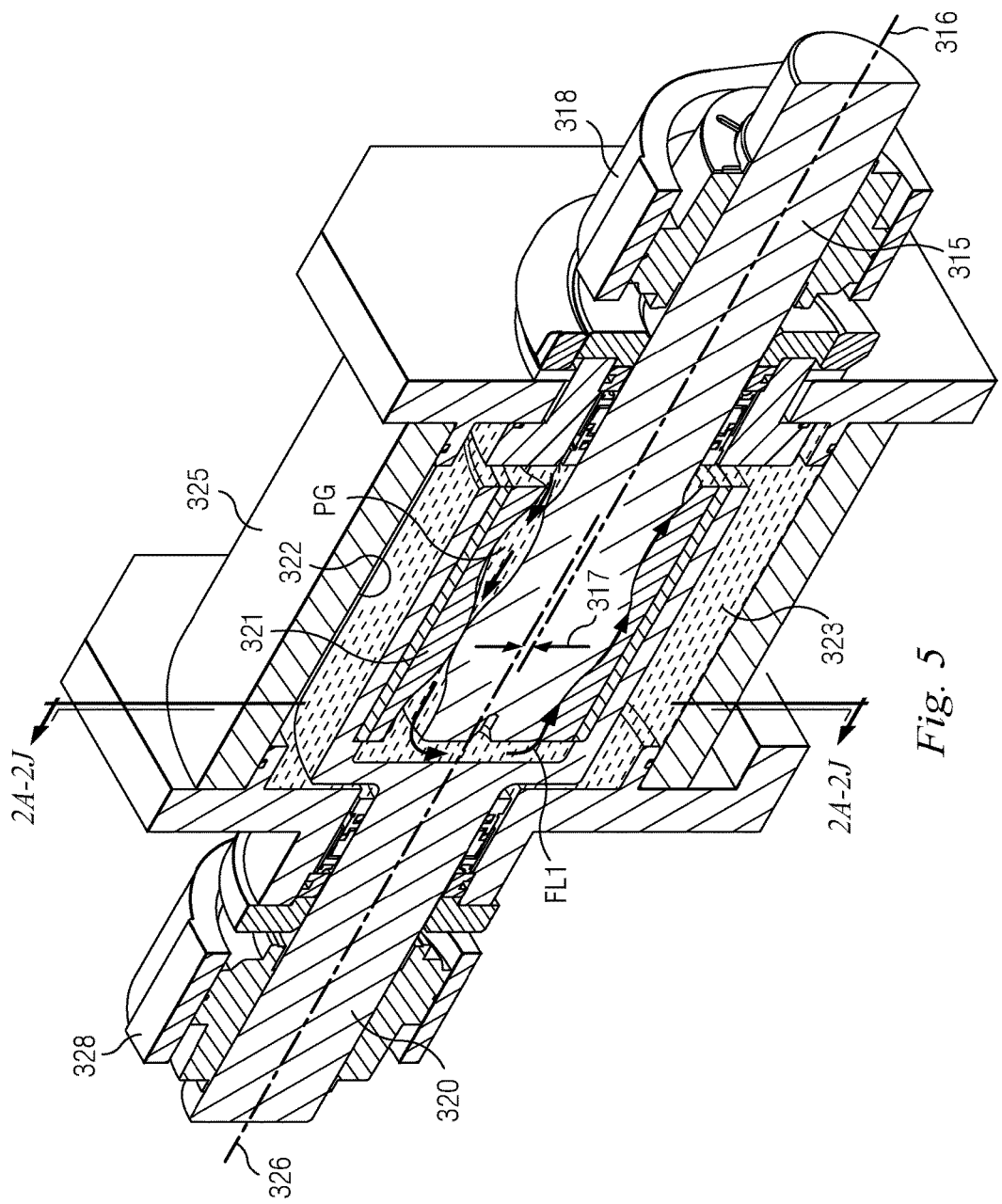
FIGS. 5 and 5A illustrate two different embodiments of test chamber 325 in cutaway view, in which test fluid 323 may follow different flow loops FL1 and FL2.
Figure 5A:
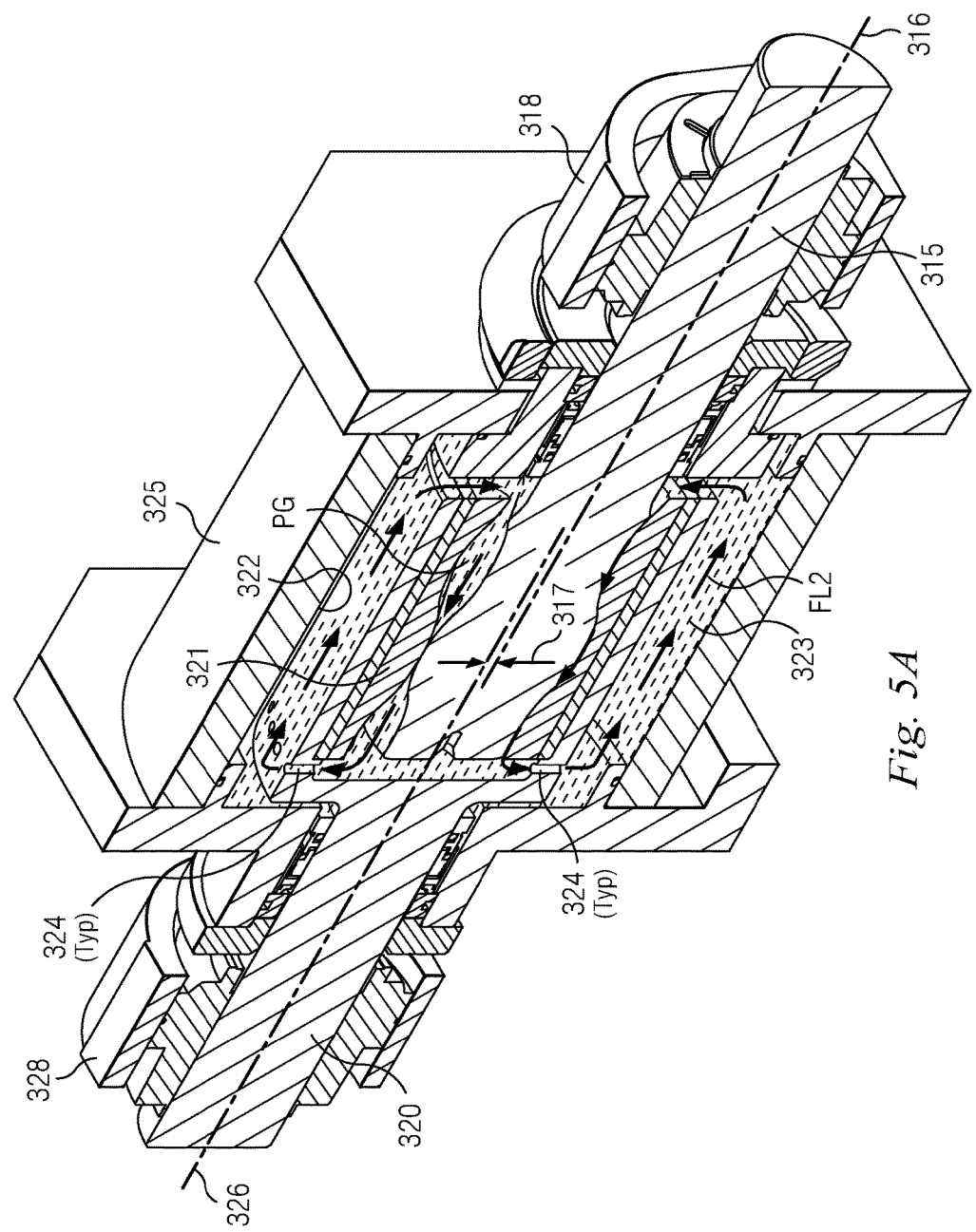

Test chamber 325 will now be discussed in more detail with reference to FIGS. 4, 5 and 5A. FIGS. 4, 5 and 5A are section views shown generally on FIG. 3. Note FIG. 3 omits specific reference to FIG. 5A mainly for clarity, it being understood from disclosure further below that FIGS. 5 and 5A are alternative embodiments and therefore the section line for FIG. 5 shown on FIG. 3 is representative for both FIGS. 5 and 5A.

Referring first to FIG. 4, test chamber 325 is seen in cutaway view. Rotor section 315 is omitted for clarity. Stator section 321 is seen rotationally and coaxially fixed to stator shaft 320. Sealable test chamber 325 also provides annular cavity 322 formed between an external periphery of stator section 321 and an internal periphery of test chamber 325. Per the embodiment of FIG. 5A, described further below, FIG. 4 depicts openings 324 provided stator section 321. (It will be appreciated from disclosure further below that openings 324 are not provided in the embodiment of FIG. 5). In operation, test chamber 325 is filled with test fluid 323 (advantageously drilling fluid) prior to being sealed so that stator section 321 is completely immersed.

FIGS. 5 and 5A illustrate two exemplary alternative embodiments of test chamber 325 in more detail with surrounding components, again in cutaway view. FIGS. 5 and 5A each depict progressing gaps PG formed on helical pathways between stator section 321 and rotor section 315. Test chamber 325 is sealed and filled with test fluid 323. It was noted in earlier disclosure that test fluid 323 is present in test chamber 325 to interact with the materials from which rotor section 315 and stator section 321 are made, in order to simulate degradation that might be seen in actual downhole conditions. It was also noted in earlier disclosure, however, that once test chamber 325 was sealed, the relative differential rotation of rotor section 315 and stator section 321 may cause the test fluid 323 to flow under low pressure through progressing gaps PG. Referring to the embodiment of FIG. 5, and as illustrated by the darker arrows on FIG. 5, first flow loop FL1 for test fluid 323 is formed through progressing gaps PG. FIG. 5 depicts first flow loop FL1 in one exemplary flow direction, although it will be understood that flow loop FL1 may arise in either direction according to user selection of the direction in which to rotate rotor section 315.

Referring now to the embodiment of FIG. 5A, openings 324 are provided in stator section 321. The darker arrows on FIG. 5A illustrate that second flow loop FL2 for test fluid 323 may form in one exemplary flow direction, through progressing gaps PG in a direction away from the end near rotor bearing 318, then through openings 324 in stator section 321, then through annular cavity 322 back to the rotor bearing end of progressing gaps PG. Again, although not specifically illustrated on FIG. 5A, it will be understood that, according to user selection of the direction in which to rotate rotor section 315, second flow loop FL2 may flow in either direction. In general, first and second flow loops FL1 and FL2 on FIGS. 5 and 5A are indifferent to the direction in which test fluid 323 may be caused to flow.

FIGS. 5 and 5A further show rotor section 315 held rotationally in place by one of rotor bearings 318. Stator shaft 320 is also shown held rotationally in place by one of stator bearings 328. FIG. 5 further illustrates a cross-section cut for FIGS. 2-A through 2-J. It will be understood that freeze-frame views seen on FIGS. 2-A through 2-J represent movement of the disclosed test apparatus within test chamber 325 along an exemplary cross-section cut line as shown on FIG. 5.

FIGS. 5 and 5A also illustrate the preselected offset 317 of rotor rotation axis 316 and stator rotation axis 326. As discussed extensively above with reference to FIGS. 2-A through 2-E, for example, offset 317 is introduced to eliminate eccentric rotation vibration during operation of test chamber 325. It will be understood that relative adjustment of rotor bearings 318 and stator bearings 328 allows test chamber 325 to accommodate a range of offsets 317 to be selected, set and held according to user requirements.

FIG. 6 illustrates exemplary embodiments of drive train 310 as more generally illustrated on FIG. 3. On FIG. 6, three alternatives are illustrated in which varying drive speeds and torques may be delivered to rotor section 315 by external motor 305 via drive train 310. It will be understood, however, that the disclosed test apparatus is not limited to the three alternatives illustrated on FIG. 6, and that the scope of the disclosed test apparatus contemplates many alternative drive speeds and torques delivered to rotor section 315. It will be further appreciated that by providing different drive speeds and torques to rotor section 315, the disclosed-test apparatus can simulate the mutation speed of a PDM power section, i.e. the "step down" effect of the "gear within the gear".

As suggested in earlier disclosure, external motor 305, drive train 310, rotor and stator bearings 318 and 328, torque sensor 330, continuous-slip brake 335, and other seals not called out by part number are all off-the-shelf components whose performance characteristics are selected to suit a particular design of the disclosed test apparatus. In presently preferred embodiments, a suitable external motor 305 is a Brook Crompton 75 HP AC 3-phase 230/460 V motor delivering up to 1800 rpm; a suitable continuous-slip brake 335 is a Wichita Clutch model KKB 208; suitable seals for test chamber 325 are UTEX models MP; suitable rotor/stator bearings 318/328 are available from Dodge; and a suitable torque transmitter 330 is a Himmelstein HRCT 39000X. The scope of the disclosed test apparatus is nonetheless not limited to any particular selection or combination of such off-the-shelf components. Likewise, the control of the disclosed test apparatus is advantageously via conventional PLC and PID control, and the scope of the disclosed test apparatus is not limited in this regard.

Referring now to commonly-invented and commonly-assigned U.S. Provisional Patent Application Ser. No. 62/311,278 (the "Provisional Application"), to which this disclosure claims priority and whose provisional disclosure is incorporated herein by reference, FIG. 7 of the Provisional Application is an exemplary finite element analysis (FEA) image of static displacement (strain) based upon known torque stresses placed on a rotor to be used in conjunction with the disclosed test apparatus. The image is color coded to show increasing strain. FEA images of the type shown on FIG. 7 of the Provisional Application are useful, for example, for sizing the external motor driving the rotor and deriving specifications for the interconnecting drive train.

There now follows description of an exemplary operation of the disclosed test apparatus. It will be understood that the following disclosure is for illustration only, and that the disclosed test apparatus is not limited thereby.

The objectives of an exemplary test protocol may include to evaluate new elastomer compounds in an environment that accurately simulates expected downhole service in an operational PDM power section. With this in mind, a test stator section is prepared with the elastomer, molded into the actual stator profile to be expected downhole. The test stator section is placed into the test chamber. In accordance with the disclosed test apparatus, the stator section is then (1) exposed the actual drilling fluids expected downhole; (2) exposed to the actual elevated temperatures expected downhole; (3) loaded with comparative (or higher) forces and cycle frequencies expected downhole. The disclosed test apparatus may then, for example, measure the number of cycles to failure under defined loads and conditions. In some embodiments, the cycles to failure may be determined by counting, through to failure, the rotor section cycles and/or the stator section cycles. In other embodiments, the rotor section and/or stator section may be examined for wear. In other embodiments, temperature change over time inside the test chamber may be monitored. In other embodiments, temperature change over time may be monitored in an elastomer layer provided by the stator section at its contact surface with the rotor section. The test data yielded by the disclosed test apparatus will be expected to correlate closely to comparative test data that might have been extracted from a hypothetical power section in downhole service, and may be used to develop elastomer compounds with improved performance characteristics according to the service. Alternatively, without limitation, the disclosed test apparatus may be used to test the performance of actual test coupons and surrounding drilling fluids taken from PDMs in service in wells with their own chemistry.

Embodiments of the disclosed test apparatus may be expected to achieve the following exemplary target performance parameters (again, the following list is not exhaustive, and the scope of the disclosed test apparatus is not limited in any of the following regards):

Test chamber temperatures up to 350-400 degrees F.;

Ability to use stator sections or rotor sections cut from actual downhole tools; and Ability to load stator elastomers up to approximately 40% strain.

It will be appreciated that the scope of the disclosed test apparatus is not limited to the construction of stator sections that may be put in the test coupon, and includes, without limitation, all-elastomer construction, hybrid metal/elastomer constructions ("evenwall") or other types of construction. Likewise, the disclosed test apparatus is not limited to the size, type or construction of rotor that may be put in the test coupon.

Alternative embodiments of the disclosed test apparatus could further include, without limitation, the following features and aspects:

(a) Substituting the disclosed offset shaft mounting of rotor and stator and convert the rotor to an eccentric transmission by which to receive rotational torque;

(b) Adapting the disclosed test apparatus to evaluate miniaturized 1.0 to 2.0 stage motors, advantageously with small diameters; and (c) Adapting the disclosed test apparatus to evaluate test coupons with straight pathways for drilling fluid rather than helical pathways.

(d) Adapting the input motor to deliver impulse loads to the rotor or stator shaft to simulate downhole torsional impacts and stall events.

(e) Varying the number and locations of rotor/stator bearings for support of the rotor/stator.

(f) Varying the number and locations of the test chamber fluid seals.

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

We claim:

1. A method for measuring load performance of a rotor/stator test coupon, the method comprising the steps of:
   (a) providing a test coupon, the test coupon including a rotor section received inside a stator section;
   (b) rotating the rotor section, wherein rotation of the rotor section actuates corresponding rotation of the stator section;
   (c) applying a braking torque to said stator section rotation actuated in step (b); and
   (d) responsive to step (c), evaluating load performance of the test coupon.

2. The method of claim 1, in which step (d) includes at least one substep selected from the group consisting of:
   (d1) controlling torque across the rotor section and the stator section;
   (d2) counting, through to failure of the test coupon, at least one of (1) rotor section rotation cycles and (2) stator section rotation cycles; and
   (d3) examining at least one of (1) the rotor section and (2) the stator section for wear.

3. The method of claim 1, in which the test coupon comprises at least a partial length of a positive displacement motor (PDM) stage.

4. The method of claim 1, in which, in step (a), at least one progressing gap on a helical pathway is formed between the rotor section and the stator section when the rotor section and the stator section are differentially rotated.

5. The method of claim 1, further comprising, after step (a) and before step (b), the substeps of:
   (a1) receiving the test coupon inside a sealable test chamber;
   (a2) filling the test chamber with test fluid; and
   (a3) sealing the test chamber.

6. The method of claim 5, in which step (d) further includes the substep of monitoring temperature change over time in the test chamber.

7. The method of claim 1, in which the stator section provides an elastomer interface at a contact surface with the rotor section inside the test coupon, and in which step step (d) includes at least one substep selected from the group consisting of:
- (d1) controlling torque across the rotor section and the stator section;
- (d2) counting, through to failure of the test coupon, at least one of (1) rotor section rotation cycles and (2) stator section rotation cycles;
- (d3) examining at least one of (1) the rotor section and (2) the stator section for wear; and
- (d4) monitoring temperature change over time in the elastomer interface.

8. The method of claim 5, in which the stator section provides an elastomer interface at a contact surface with the rotor section inside the test coupon, and in which step (d) further includes the substep of monitoring temperature change over time in the test chamber.

9. The method of claim 5, in which:
- (1) in step (a), at least one progressing gap on a helical pathway is formed between the rotor section and the stator section when the rotor section and the stator section are differentially rotated; and
- (2) a first flow loop of test fluid is formed through the at least one progressing gap when the test chamber is sealed and the rotor section is rotated.

10. The method of claim 5, in which:
- (1) in step (a), at least one progressing gap on a helical pathway is formed between the rotor section and the stator section when the rotor section and the stator section are differentially rotated; and
- (2) an annular cavity is formed between an external periphery of the stator section and an internal periphery of the test chamber, wherein the at least one progressing gap, a plurality of openings in the stator section, and the annular cavity form a second flow loop of test fluid when the test chamber is sealed and the rotor section is rotated.

11. The method of claim 1, in which the rotor section and the stator section are rotated about a longitudinal rotor axis and a longitudinal stator axis respectively, and in which the rotor axis and the stator axis are offset by a preselected axis offset distance.

12. The method of claim 11, in which the test coupon is selected to be representative of a full size PDM stage having a known rotor/stator eccentricity, and in which the preselected axis offset distance is selected to be substantially the same as the known rotor/stator eccentricity.

13. The method of claim 1, in which the test coupon is cut from a full size PDM stage through which drilling fluid was previously caused to flow.

14. The method of claim 5, in which the test fluid was previously passed through a full size PDM stage.

15. A method for measuring load performance of a rotor/stator test coupon, the method comprising the steps of:
- (a) providing a test coupon, the test coupon including a rotor section received inside a stator section;
- (b) rotating the stator section, wherein rotation of the stator section actuates corresponding rotation of the rotor section;
- (c) applying a braking torque to said rotor section rotation actuated in step (b); and
- (d) responsive to step (c), evaluating load performance of the test coupon.

16. The method of claim 15, in which step (d) includes at least one substep selected from the group consisting of:
- (d1) controlling torque across the rotor section and the stator section;
- (d2) counting, through to failure of the test coupon, at least one of (1) rotor section rotation cycles and (2) stator section rotation cycles; and
- (d3) examining at least one of (1) the rotor section and (2) the stator section for wear.

17. The method of claim 15, in which the test coupon comprises at least a partial length of a positive displacement motor (PDM) stage.

18. The method of claim 15, in which, in step (a), at least one progressing gap on a helical pathway is formed between the rotor section and the stator section when the rotor section and the stator section are differentially rotated.

19. The method of claim 15, further comprising, after step (a) and before step (b), the substeps of:
- (a1) receiving the test coupon inside a sealable test chamber;
- (a2) filling the test chamber with test fluid; and
- (a3) sealing the test chamber.

20. The method of claim 19, in which step (d) further includes the substep of monitoring temperature change over time in the test chamber.

21. The method of claim 15, in which the stator section provides an elastomer interface at a contact surface with the rotor section inside the test coupon, and in which step step (d) includes at least one substep selected from the group consisting of:
- (d1) controlling torque across the rotor section and the stator section;
- (d2) counting, through to failure of the test coupon, at least one of (1) rotor section rotation cycles and (2) stator section rotation cycles;
- (d3) examining at least one of (1) the rotor section and (2) the stator section for wear; and
- (d4) monitoring temperature change over time in the elastomer interface.

22. The method of claim 19, in which the stator section provides an elastomer interface at a contact surface with the rotor section inside the test coupon, and in which step (d) further includes the substep of monitoring temperature change over time in the test chamber.

23. The method of claim 19, in which:
- (1) in step (a), at least one progressing gap on a helical pathway is formed between the rotor section and the stator section when the rotor section and the stator section are differentially rotated; and
- (2) a first flow loop of test fluid is formed through the at least one progressing gap when the test chamber is sealed and the rotor section is rotated.

24. The method of claim 19, in which:
- (1) in step (a), at least one progressing gap on a helical pathway is formed between the rotor section and the stator section when the rotor section and the stator section are differentially rotated; and
- (2) an annular cavity is formed between an external periphery of the stator section and an internal periphery of the test chamber, wherein the at least one progressing gap, a plurality of openings in the stator section, and the annular cavity form a second flow loop of test fluid when the test chamber is sealed and the rotor section is rotated.

25. The method of claim 15, in which the rotor section and the stator section are rotated about a longitudinal rotor axis and a longitudinal stator axis respectively, and in which the rotor axis and the stator axis are offset by a preselected axis offset distance.

26. The method of claim 25, in which the test coupon is selected to be representative of a full size PDM stage having a known rotor/stator eccentricity, and in which the preselected axis offset distance is selected to be substantially the same as the known rotor/stator eccentricity.

27. The method of claim 15, in which the test coupon is cut from a full size PDM stage through which drilling fluid was previously caused to flow.

28. The method of claim 19, in which the test fluid was previously passed through a full size PDM stage.

* * * * *